Jan. 12, 1932. J. N. WILLIAMS 1,840,926
ATTACHMENT FOR MOTION PICTURE PROJECTING MACHINES
Original Filed Oct. 9, 1926
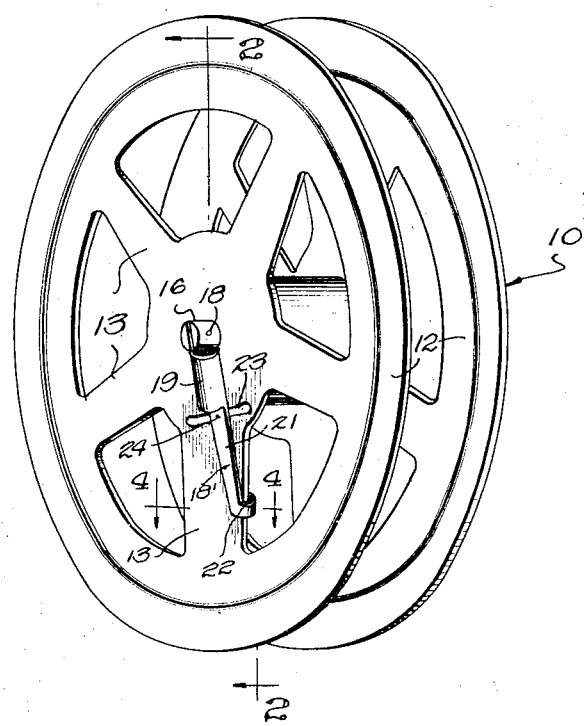
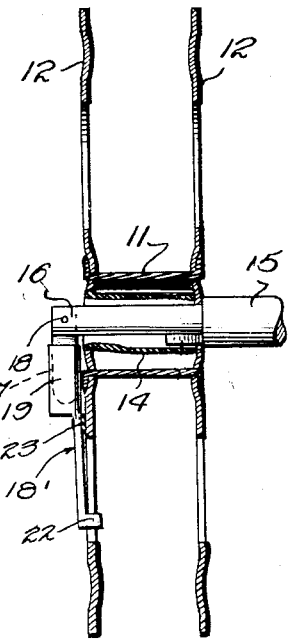
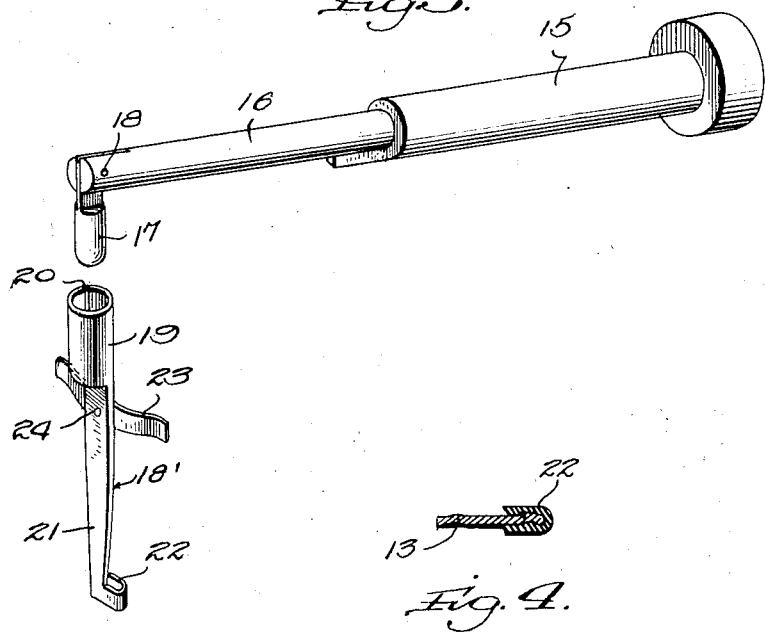
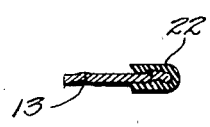
Inventor
JOSIAH N. WILLIAMS
By C. M. Parker
Attorney Patented Jan. 12, 1932

1,840,926

UNITED STATES PATENT OFFICE

JOSIAH NUEL WILLIAMS, OF LANDGRAFF, WEST VIRGINIA, ASSIGNOR OF ONE-HALF TO LETCHER C. WINGATE, OF INDEPENDENCE, VIRGINIA

ATTACHMENT FOR MOTION PICTURE PROJECTING MACHINES

Application filed October 9, 1926, Serial No. 140,487. Renewed August 12, 1931.

This invention relates to attachments for motion picture projecting machines and more particularly to an attachment adapted to be used with badly worn reels in the lower magazines of such machines.

As is well known to motion picture operators, reels which are badly worn so that they do not run true on their supporting shafts, are the cause of delays occasioned by the necessity for removing the films from such worn reels and rewinding them upon newer or better reels.

It is an important object of the present invention to provide a simple reel attachment whereby a worn reel may be operated as efficiently as a new and perfect reel.

A further object is to provide an attachment adapted to be connected between a portion of the reel and the shaft therefor whereby these members are caused to run perfectly together thus removing the necessity for rewinding the film on a new reel.

Other objects and advantages of the invention will be apparent during the course of the following description.

In the drawings I have shown a preferred embodiment of my invention. In this showing, Figure 1 is a perspective view of a reel showing the invention applied, Figure 2 is a section taken substantially on line 2—2 of Figure 1, Figure 3 is a detail perspective of the attachment and reel shaft separated, and Figure 4 is a detail section on line 4—4 of Figure 1.

Referring to the drawings the numeral 10 designates an ordinary reel such as is employed in an ordinary motion picture projecting apparatus. This reel includes a hub 11 upon which the film is wound and guide flanges 12 having spokes 13 formed therein. The reel further includes a central tubular member 14. The elements of the reel are formed of stamped sheet metal as is well known, and the tubular sleeve 14, after a long period of use, becomes badly worn or loosened and displaced thus making it difficult for the reel to be used on the usual shaft.

Referring to Figures 2 and 3, the numeral 15 designates the usual reel shaft having a reduced portion 16 which extends through the sleeve 14. The shaft 15 is adapted to be keyed to the reel to cause the latter to rotate with the shaft. The free end of the reduced portion of the shaft is provided with a substantially cylindrical extension 17 pivotally connected thereto as at 18.

The attachment for connecting the reel and shaft is shown in detail in Figure 3 of the drawings and is preferably formed of relatively rigid sheet metal. The attachment is indicated as a whole by the numeral 18' and includes at its upper end a substantially cylindrical portion 19, split as at 20, and adapted to frictionally receive the projection 17. The attachment is further provided with a relatively flat extension 21 having a substantially U-shaped spring clip 22 formed on its free end. A transverse spring clip 23 is secured as at 24 to the extension 21 adjacent the sleeve 19.

The operation of the device is as follows:

When a worn reel is to be used, the extension 17 is swung to a position in alinement with the reel shaft, whereupon the extension and the reduced portion of the shaft may be inserted in position as shown in Figure 2. The sleeve 19 is then slipped over the extension 17, the sleeve 19 preferably being formed of resilient material whereby it snugly engages the extension 17. The attachment 18' and the extension 17 are then swung to the position indicated in Figures 1 and 2 with the attachment 18' lying adjacent the outer face of one flange of the reel. The clip 22 is then swung inwardly and slipped over one edge of one of the spokes 13, this action causing the clip 23 to firmly engage the outer face of the flange. The device is then ready for operation and the machine may be operated in the usual manner. The attachment serves to firmly secure the worn reel to the shaft whereby it may be efficiently operated. It will be apparent that the device readily may be applied and removed. As previously stated, the clips 22 and 23 frictionally engage the reel and firmly support the free end of the shaft with respect to the reel. It will be apparent that the clip is adapted to be moved against the tension exerted by the clips whereby the free end of the shaft properly may be centered with respect to the reel.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:

1. The combination with a reel and a shaft therefor having a pivoted extension movable to a lateral position with respect to said shaft, of means frictionally connected at one end to said extension when the latter is in a lateral position and at its opposite end to said reel at a point remote from said shaft.

2. The combination with a reel having a central sleeve and a shaft adapted to be received in said sleeve and having an extension on one end thereof movable to a position whereby the axis of said extension is angularly arranged with respect to the axis of said shaft, of means frictionally engageable at one end to said extension when the axis of the latter is in said angular position and at its opposite end to said reel.

3. The combination of a reel having a central sleeve and a shaft adapted to extend through said sleeve and having a pivoted extension at one end movable to a position whereby the axis of said extension is substantially perpendicular to the axis of said shaft, of an attachment having means at opposite ends thereof for frictionally engaging said extension in its perpendicular position and a portion of said reel.

4. The combination of a shaft having a pivoted extension at one end thereof, and a reel upon said shaft, of a member having a split sleeve at one end adapted to engage upon said pivoted extension and a clip at its opposite end adapted to engage a portion of said reel and movable radially thereof.

5. A device of the character described comprising a member having a split sleeve at one end adapted to engage a pivoted extension of a rotating shaft having a reel thereon, and a U-shaped clip at its opposite end adapted to engage a portion of said reel, and a spring intermediate said ends and adapted to bear against said reel.

6. The combination of a shaft having a pivoted extension at one end thereof, and a reel upon said shaft, of a member having a split sleeve at one end adapted to engage upon said pivoted extension, a clip at its opposite end adapted to engage a portion of said reel and movable radially thereof, and a spring carried by said member intermediate its ends adapted to bear against said reel.

In testimony whereof I affix my signature.

JOSIAH NUEL WILLIAMS.